April 30, 1968 E. GARABEDIAN 3,380,512
MOLDING APPARATUS WITH SELECTED MOLD PIVOTING MEANS
Filed May 12, 1964 2 Sheets-Sheet 1

INVENTOR.
EDWARD GARABEDIAN
BY
Barlow & Barlow
ATTORNEYS

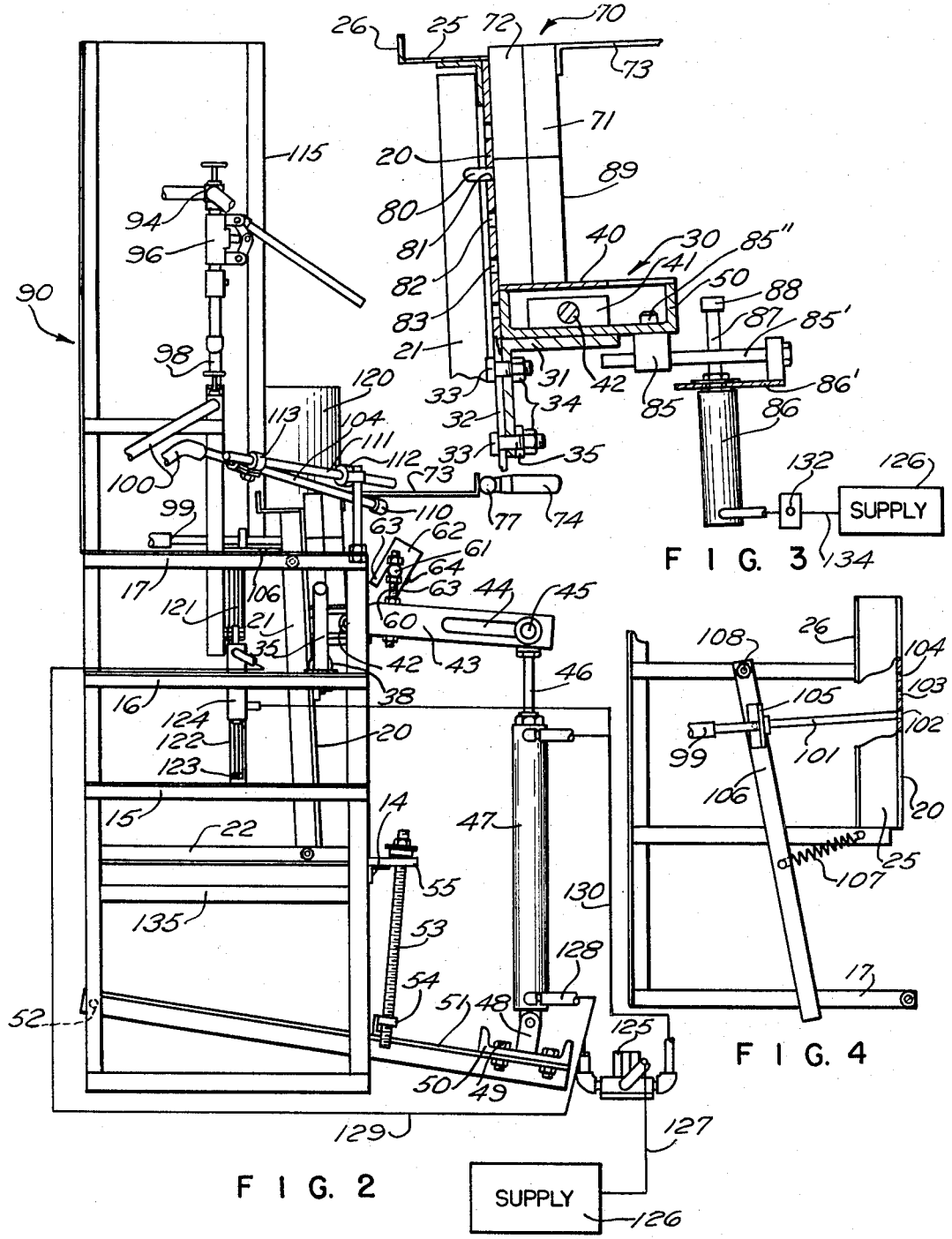

3,380,512
MOLDING APPARATUS WITH SELECTED
MOLD PIVOTING MEANS
Edward Garabedian, 83 Walnut St.,
East Providence, R.I. 02914
Filed May 12, 1964, Ser. No. 366,836
5 Claims. (Cl. 164—341)

This invention relates to a molding apparatus to facilitate the handling of a mold used for casting small objects such as jewelry or the like.

The invention is an improvement upon the apparatus shown in my Patent No. 2,713,184 dated July 19, 1955.

One of the principal objects of the invention is to provide greater safety to the operator against burns or other accidents which might result in handling of the mold in the apparatus.

Another object of the invention is to minimize the physical, manual labor in handling a mold in the apparatus.

A still further object of the invention is to provide an apparatus which may be operated quicker by reason of the mechanical assistance provided than in the apparatus of my above said patent.

Another object of the invention is to provide an apparatus which may be easily adjusted to accommodate molds of different sizes in order that the apparatus may have greater use.

With these and other objects in view, the invention consists of certain novel features of construction as will be more fully described and particularly pointed out in the appended claims.

In the accompanying drawings:

FIG. 2 is a side elevation;

FIG. 3 is a sectional view of a detail showing the shelf for supporting the mold; and FIG. 4 is a fragmental detail elevation illustrating the mounting of the means for cooling the back part of the mold.

Figure 1:
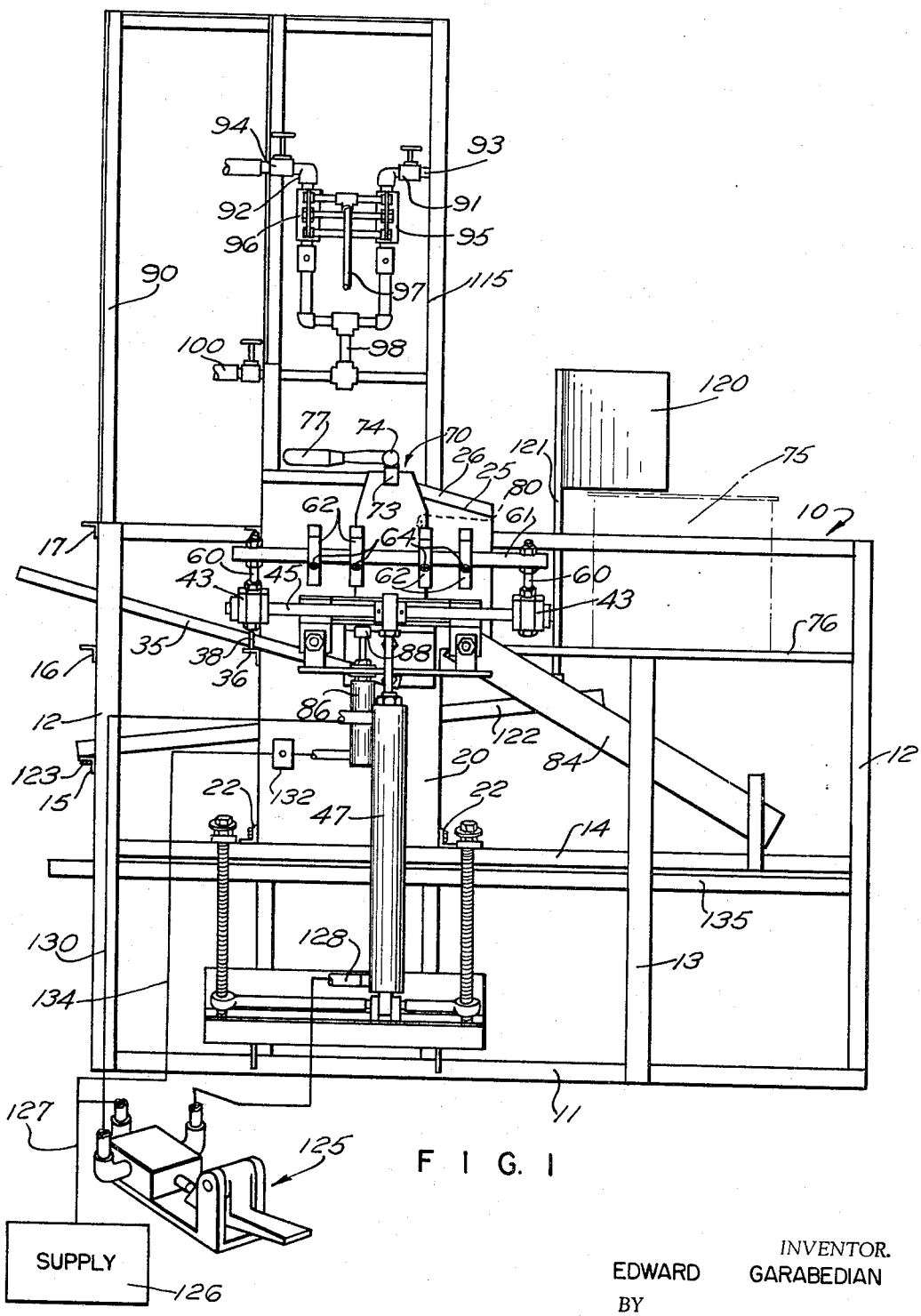
FIG. 1 is a front elevation of the apparatus.

With reference to the drawings, 10 designates generally an open framework of angle irons used as a supporting structure for the various parts of the apparatus. The frame comprises essentially a base 11, corner uprights 12 and intermediate uprights 13, which uprights are connected by crossbars at various levels 14, 15, 16 and top crossbar 17, each of which may exist in pairs or triplicate as convenience dictates. A backplate 20 having ribs 21 is supported on crossbars 22 at its lower end and similarly supported upon another crossbar adjacent its upper end in a slightly inclined position. This plate is equipped with a chute 25 (FIG. 3) at its upper edge having a flange 26 for a purpose which will be later explained. This chute is angled as seen in FIG. 1 to discharge at its lower right hand edge as there shown.

A shelf designated generally 30 and seen more clearly in FIG. 3 is supported by an angle bracket 31 which is adjustably secured to the plate 20 by means of a slot 32 and T bolts 33 having nuts 34. A lever 35 has an opening embracing the lower of these bolts 33 and is fulcrumed over the angle iron 36, FIG. 1 through the U bolt 38 so that by rocking this lever 35 with the nuts 34 loosened, the bracket 31 may be adjusted to position the shelf 30 at the desired height along the backplate 20 which is inclined slightly backwardly from the vertical. After the shelf is adjusted to its desired position, it may be secured there by tightening up the nuts 34 which also secure the lever in its position. This shelf is of general channel shape having a supporting deck 40 and internal blocks 41, through which the shaft 42 extends for pivotally mounting a pair of arms 43 (FIG. 2) at either end of the shelf. These arms are slotted as at 44 and adjustably receive in this slot a rod 45 to which one end of the plunger 46 of the air cylinder 47 is connected for lifting these arms upwardly about the shaft 42 as an axis. The lower end of this air cylinder 47 is rockably connected to the bifurcated arms 48 which are mounted upon a base 49 which may be adjusted by means of support 50 along the platform 51 toward and from the frame which platform is hingedly mounted to the frame as at 52 and may be adjusted to different vertical positions by means of the rod 53 passing through the nut 54 and engaging the bracket 55 fixed to the frame as a support.

The arms 43 carry at a point spaced from the shaft 42, studs 60 which are threaded so as to adjustably mount a crossbar 61 upon which there are a plurality of blocks 62 having bifurcated arms 63 to straddle the crossbar and be clamped in position by set screws 64. These blocks are so positioned that as the arms are swung upwardly, they will engage the mold designated generally 70 and urge the two parts of the mold together.

The mold comprises a front part 71 and a back part 72 (FIG. 3), which may be engaged by the blocks 62 and the two parts pressed together, and when in this pressed position, the mold may be filled with a ladle from a pot 75 which is supported upon a platform 76 of angle iron supported from the frame of the machine. This pot is heated suitably from some gas flame source which is omitted from the drawing for the sake of clarity of the rest of the parts. A ladle is utilized for dipping the molten material from the pot 75 and pouring into the gate of the mold when held clamped by the pressure of the blocks 62. Extending outwardly from the front part of the mold there is a handle having a shank portion 73 and a handle portion 74, with a second handle at right angles to the first handle, designated 77. From the back part of the mold 72, there extends a pin 80 (FIG. 3) which as seen in FIG. 1 is located adjacent the right hand edge of the mold; and this pin 80 may be placed in a selected one of the openings 81, 82 or 83 in the backplate depending upon the size of the mold and the relative position of the shelf 30.

An inclined chute 84 is located vertically beneath the shelf 30 adjacent the backplate 10 and is of a width to also be beneath the chute 25 (FIG. 3), first above described.

The shelf 30 also carries in bearing block 85 (FIG. 3) an air cylinder 86 having a plunger 87 extending therefrom with a hammer head 88, which by reason of a flexible supply line is adjusted to such a position, that when the mold 70 is laid flat upon the shelf with its surface 89 contacting the upper surface of the deck 40, air pressure may be used to cause the plunger and hammer head 88 to strike the mold to shake loose the casting therein when necessary. Adjustment of cylinder 86 in a slot in plate 86′ may be had and also adjustment may be had of rod 85′ through block 85 by means of set screw 85″.

3

In order to quickly cool the mold, I have provided a mixture of compressed air and water mounted upon the superstructure 90 of the framework and comprising a water inlet 91 (FIG. 1) and an air inlet 92, the water inlet being controlled by the valve 93 and the air inlet being controlled by valve 94, as to the amount of water and air that will be passed therethrough. On and off valves 95 and 96 are commonly controlled by a handle 97 and these two fluids come together in a common conduit 98 from which it is fed to the back of the mold through conduit 99 and to the front of the mold through conduit 100. Conduit 99 terminates in a nozzle 101 (FIG. 4) which may be placed in any selected opening 102, 103 and 104 in the backplate adjacent the location of the mold by means of this nozzle being mounted in a bracket 105 supported on a swingable lever 106 and urged in a direction to hold the nozzle in place by spring 107. In order to withdraw this nozzle from one of the openings, it is merely necessary to swing the lever 106 about its pivot 108 and then manually insert the nozzle in another of the selected openings.

The water from the conduit 100 to the front of the mold is discharged through a nozzle 110, supported by a bar 111, and a swivel clamp 112, and carrying a swivelly mounted clamp 113 for the extended length of the nozzle which may be suitably held in adjusted position by clamping nuts. A shield 115 extends about the cooling piping supported in the superstructure 90 so as to prevent any leak of water entering the pot of molten material 75.

In order to prevent use of the molten material until the mold 70 is in clamped position, there is a guard 120 mounted upon an arm 121 supported by lever 122 pivoted as at 123 and actuated by an air cylinder 124 (FIG. 2) which will cause the shield to be depressed and lowered to a point level with the pot when the air cylinder 47 is actuated to press the blocks 62 against the mold and hold it in closed clamp operation. In this operation, the two parts of the mold 70 are positioned upon the shelf 30 with a pin 80 in one of the selected holes of the backplate and with the back of the mold up against the backplate. A foot threadle 125 is then pressed so as to permit air to pass from the supply 126 through conduit 127 to the air cylinder 47 through conduit 128 and at the same time to the air cylinder 124 through conduit 129 so as to raise the arms 43, and lower the shield 120. As the arms 43 rise, the blocks 62 will press the two parts of the mold into firm engagement, a ladle will then be used to dip into the molten material in pot 75 and pour it into the gate of the mold. The foot pedal will then be released, pressure will enter the upper end of cylinder 47 through conduit 130 and the arms 43 will be retracted. Also, pressure will enter the lower port of cylinder 124 and raise the piston therein. At the same time, the operator will engage the handle 74 and by manual pressure hold the mold in closed position. As soon as the mold is released by mechanical pressure, the operator will tip the mold about the pin 80 as a pivot so as to pour from the gate the molten material which is there, leaving the gate free for further manipulation. He will then rock the mold back to its position pressing it against the backplate and reach for the handle 97 which controls the cooling water and air, and upon pulling down its lever, water and air will squirt against both the back and front side of the mold parts so as to quickly cool them and when this has been accomplished, the mold will be laid down upon the shelf and opened by a pair of pliers which the operator carries in his hand and the cast part will be removed from the mold. Should the cast part be one that would stick in the mold, then it is merely necessary for the operator to press the button 132 (FIG. 3) which controls the supply of air to the cylinder 86 through flexible conduit 134 to operate the hammer 88. This hammer will strike the mold and loosen the casting in the mold permitting the operator to pick it out with the pliers.

4

If different size molds are utilized, the shelf will be adjusted relative to the backplate as above indicated until the mold is at the right position so that its pin enters one of the openings 81, 82 or 83 in the backplate and for further accommodation of the position of different size molds, the air cylinder 47 may be adjusted along its arms 43 at its upper end or along the platform 51 at its lower end. For different size strokes, the platform may be adjusted vertically.

The shielding 120 gives maximum protection to the operator and prevents carelessness in dipping out of the pot if the mold is not securely closed. Also, the chutes are such that they are handy for discharging the gate of the mold and carrying away the material to a collection point.

As the material discharges from the chutes 84 it is collected in a pan 135 which extends the entire length of the machine and will also serve to collect any drippings of water as the mold is cooled and convey these drippings to some suitable point.

From the supply 126, air is conducted by conduit 127 where it is controlled by the foot valve 125 in such a way that it will enter the cylinder 47 by conduit 128 and it will also pass to cylinder 124 by conduit 129. As soon as the foot valve 125 is released, the air from the supply is shifted to conduit 130 to enter the upper end of the cylinder 47 and draw the plunger 46 downwardly, while air enters the lower port of cylinder 124 causing plunger 121 therein to move the shield 120 upwardly.

I claim:

1. A molding apparatus comprising a frame, an upright back plate fixed to said frame having a plurality of openings therein, a mold separate from said plate having a gate at one edge, a shelf extending at generally right angles to said plate to an extent beyond the thickness of the mold when against said plate and in a position to have its gate open upwardly and to an extent to support the mold but less than the height of the mold so that said mold will protrude beyond the shelf when laid on its face on said shelf, said mold comprising a front part and a back part, means to hold the mold parts together while liquid is poured into the mold, said front part having a handle and said back part having a single pin entering a selected one of said openings and about which said mold may be pivoted by manual manipulation of said handle for discharging the mold material from said gate, and a hammer attached adjacent said shelf in a location to hit the portion of the mold extending beyond the shelf when laid on its face on said shelf.

2. A molding apparatus comprising a frame, an upright back plate fixed to said frame having a plurality of openings therein, a mold separate from said plate having a front part and a back part and a gate at one edge, a shelf extending at generally right angles to said plate to an extent to support the mold, means to hold the mold parts together while liquid is poured into the mold, said front part having a handle and said back part having a single pin entering a selected one of said openings and about which said mold may be pivoted by manual manipulation of said handle for discharging the mold material from said gate.

3. A molding apparatus as in claim 2 wherein the means to hold the parts together comprise arms swingable about a pivot axis with power means adjustably connected to said arms to swing said arms.

4. A mold apparatus as in claim 3 wherein arms are hingedly mounted on said shelf, means to swing said arms about their pivotal axis comprising an air cylinder and a platform hinged to said frame on which the lower end of said cylinder is mounted and means to adjust said platform relative to said frame.

5. A mold apparatus as in claim 3 wherein arms are hingedly mounted on said shelf, means to swing said arms about their pivotal axis comprising an air cylinder and a platform hinged to said frame on which the lower end of said cylinder is mounted and means to adjust said platform relative to said frame and means to adjust the lower end of said cylinder relative to said platform.

References Cited

UNITED STATES PATENTS

| | | | |
|---|---|---|---|
| 1,458,569 | 6/1923 | Berg | 123—116 |
| 1,565,668 | 12/1925 | Nickolls | 145—29 |
| 1,611,697 | 12/1926 | Tommey. | |
| 1,945,430 | 1/1934 | Garrett | 17—110 |
| 2,667,674 | 2/1954 | Hines | 198—20 |
| 2,713,184 | 7/1955 | Garabedian | 164—341 |
| 3,013,321 | 12/1961 | McElroy | 25—41 |
| 1,874,635 | 8/1932 | Scherer | 164—409 |

FOREIGN PATENTS 318,823  9/1929  Great Britain.

J. SPENCER OVERHOLSER, *Primary Examiner.*

R. D. BALDWIN, *Assistant Examiner.*